United States Patent
Wang et al.

(10) Patent No.: US 9,693,258 B2
(45) Date of Patent: Jun. 27, 2017

(54) BASE STATION, AND A METHOD FOR ADAPTING LINK ADAPTATION IN A WIRELESS COMMUNICATIONS NETWORK

(71) Applicant: Telefonaktiebolaget L M Ericsson (publ), Stockholm (SE)

(72) Inventors: Hongwei Wang, Solna (SE); Marco Belleschi, Solna (SE); Björn Nordström, Stockholm (SE)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 402 days.

(21) Appl. No.: 14/512,594

(22) Filed: Oct. 13, 2014

(65) Prior Publication Data
US 2015/0117196 A1  Apr. 30, 2015

(30) Foreign Application Priority Data

Oct. 30, 2013  (EP) .................................... 13190863

(51) Int. Cl.
*H04W 28/02* (2009.01)
*H04L 1/00* (2006.01)
*H04L 12/851* (2013.01)

(52) U.S. Cl.
CPC ....... *H04W 28/0236* (2013.01); *H04L 1/0015* (2013.01); *H04L 1/0018* (2013.01); *H04W 28/0289* (2013.01); *H04L 1/0003* (2013.01); *H04L 1/0009* (2013.01); *H04L 47/24* (2013.01)

(58) Field of Classification Search
None
See application file for complete search history.

(56) References Cited

U.S. PATENT DOCUMENTS

| | | | |
|---|---|---|---|
| 2004/0170179 A1* | 9/2004 | Johansson | H04L 47/10 370/395.2 |
| 2005/0250540 A1* | 11/2005 | Ishii | H04B 1/1027 455/561 |
| 2006/0084389 A1 | 4/2006 | Beale et al. | |
| 2008/0020775 A1* | 1/2008 | Willars | H04L 47/10 455/445 |
| 2011/0007790 A1 | 1/2011 | Xu et al. | |
| 2012/0300742 A1 | 11/2012 | Eriksson et al. | |

OTHER PUBLICATIONS

Communication with European Search Report, European Application No. 13190863.4, Apr. 22, 2014.

* cited by examiner

*Primary Examiner* — Faruk Hamza
*Assistant Examiner* — Cassandra Decker
(74) *Attorney, Agent, or Firm* — Sage Patent Group

(57) ABSTRACT

A method in a base station for adapting link adaptation of a transmission between a user equipment and the base station is provided. The link adaptation relates to an initial value of a Block Error Rate, BLER, related to the transmission. The base station decides that the user equipment is in congestion responsive to a scheduling bit rate for the transmission in relation to a rate of data packets arriving to or being sent by the user equipment being below a first threshold. Responsive to the user equipment being in congestion, the base station adapts the link adaptation by increasing the value of the BLER of the link adaptation in relation to the initial value, until the user equipment is out of congestion or until the base station detects that any one of the user equipment and the base station tries to send high priority data.

12 Claims, 4 Drawing Sheets

US 9,693,258 B2

BASE STATION, AND A METHOD FOR ADAPTING LINK ADAPTATION IN A WIRELESS COMMUNICATIONS NETWORK

CROSS REFERENCE TO RELATED APPLICATION

This application claims priority to European Patent Application No. 13190863.4, filed Oct. 30, 2013, the disclosure and content of which is incorporated herein by reference in its entirety as if set forth fully herein.

TECHNICAL FIELD

Embodiments herein relate to a base station, and a method therein. In particular, it relates to adapting link adaptation of a transmission between a user equipment and the base station.

BACKGROUND

Wireless terminals are enabled to communicate wirelessly in a cellular communications network or wireless communication network, sometimes also referred to as a cellular radio system or cellular networks. Communication devices such as wireless terminals are also known as e.g. User Equipments (UE), mobile terminals and/or mobile stations. Wireless terminals may further be referred to as mobile telephones, cellular telephones, laptops, tablet computers or surf plates with wireless capability, just to mention some further examples. The communication may be performed e.g. between two wireless terminals, between a wireless terminal and a regular telephone and/or between a wireless terminal and a server via a Radio Access Network (RAN) and possibly one or more core networks, comprised within the cellular communications network.

The cellular communications network covers a geographical area which is divided into cell areas, wherein each cell area being served by an access node. A cell is the geographical area where radio coverage is provided by the access node.

The access node may further control several transmission points, e.g. having Radio Units (RRUs). A cell can thus comprise one or more access nodes each controlling one or more transmission/reception points. A transmission point, also referred to as a transmission/reception point, is an entity that transmits and/or receives radio signals. The entity has a position in space, e.g. an antenna. An access node is an entity that controls one or more transmission points. The access node may e.g. be a base station such as a Radio Base Station (RBS), eNB, eNodeB, NodeB, B node, or BTS (Base Transceiver Station), depending on the technology and terminology used. The base stations may be of different classes such as e.g. macro eNodeB, home eNodeB or pico base station, based on transmission power and thereby also cell size.

Further, each access node may support one or several communication technologies. The access nodes communicate over an air interface operating on radio frequencies with the wireless terminals within range of the access node. In the context of this disclosure, the expression Downlink (DL) is used for the transmission path from the base station to the wireless terminal. The expression Uplink (UL) is used for the transmission path in the opposite direction i.e. from the wireless terminal to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE is controlled by the radio base station.

Wireless communication has been overtaking the wired communication since the last decade of last century, and the transmitted data volume has been increased dramatically every year. From making a voice call, to sending SMS, to surfing the web, sharing data with friends and so on, wireless communication has changed significantly, and now it is playing an important role in people's normal life.

After several evolutions from GSM to WCDMA, the most recent wireless technology, LTE treats all the transmitted data in the same way as Internet protocol (IP) data and follow the same protocol and algorithms at higher layers such as e.g. Transmission Control Protocol (TCP) or User Datagram Protocol (UDP) regardless of the traffic type. It makes the system easier to maintain and also it simplifies hardware implementation. However, it makes the scheduling algorithm more complicated in the base station, in order to fulfill the Quality of Service (QoS) requirements of different traffic.

Scheduling Strategy

It is the frequency spectrum that is used to carry all the transmitted data in the wireless network. Due to the limited amount of spectrum, and increasing users and data volume, it is very critical to utilize the frequency resource more efficient than ever before. In order to fully explore the frequency resources, a scheduler in a base station is performing a resource allocation algorithm. The base station which may be referred to as eNB in LTE, is making the scheduling decision every Transmit Time Interval (TTI), where it should be decided how the frequency resource should be allocated among all the user equipments. Generally, the scheduler prioritizes user equipments according to a QoS requirement of different user equipment's data traffic; for example, control signaling is always prioritized over web data traffic. Control signaling may refer to those data carried by Singal Radio Bearer (SRB), e.g. the data using Radio Resource Control (RRC) protocol.

Transport Block Size (TBS)

To enable efficient usage of the frequency spectrum, different Modulation and Coding schemes (MCS) are utilized to maximize bits per Hertz (Hz). As known, the Quadrature Phase Shift Keying (QPSK), 16 constellation points Quadrature Amplitude Modulation (16QAM), and 64 constellation points QAM (64QAM) are all used in the LTE system. Higher order modulation means larger number of bits per Hz but lower robustness. A link adaptation algorithm is used to select the MCS, according to a Hybrid Automatic Repeat Request (HARQ) operation as well as the user equipment's channel condition and power condition.

Based on the number of allocated Physical Resource Blocks (PRBs), and the selected MCS, the TBS is calculated according to 3GPP 36.213, Table 7.1.7.2.1-1. According to such table, the TBS may vary from 16 bits to 75376 bits with 20 Mhz bandwidth System where the maximum number of bits is increased linearly with the bandwidth. Simply, the TBS may be imagined as the amount of information bits a user equipment can transmit within one scheduling opportunity. The information bits mentioned here means the Media Access Control (MAC) Packet Data Unit (PDU) size which relates to bits transmitted in the physical layer, including both a MAC header e.g. mac control elements, and a MAC payload.

Delay Sensitive Traffic

In the evolution of wireless communication networks, more and more applications are using LTE as a data transmission network. Throughput turns not to be the only key parameter of transmission quality, but also other requirements acquire importance depending on the QoS of some specific traffic. For instance, Voice over IP (VoIP) is one type of traffic that is less throughput sensitive, but packet delay sensitive. VoIP is a protocol for the delivery of voice communications and multimedia sessions over IP networks, such as the Internet. A lower packet delay gives a better quality of a VoIP service than higher physical bit rate. Simply said, if an RTP packet of VoIP cannot be transmitted on time, it will be useless. The real time video and online gaming are also classified as delay sensitive traffic.

VoIP Traffic Mode

VoIP traffic comprises of two different modes, one TALK mode and one Silence Indicator (SID) mode. Literally, TALK mode indicates that a user equipment is talking, while SID mode indicates that the user equipment is listening. A packet comprises two kinds of data, control information such as a header, and user data also referred to as payload. The packets are generated with different size and intensity for the two modes. It is commonly 20 ms interval time during TALK Mode and 160 ms during SID mode. Typically, an RTP payload size in Talk mode is much larger than the packet Size in SID mode, depending on the used codec on the Adaptive Multi Rate (AMR) codec. For example, by using the AMR codec, with 12.2 kbps, it gives around 256 bits of RTP payload. Without Robust Header Compression (ROHC), all RTP/UDP/IP/PDCP/RLC headers may make a Radio Link Control (RLC) Service Data Unit (SDU) packet at a MAC layer during TALK which is as much as 594 bits considering IPv4 is used. Note that header sizes of different protocol level may be slightly different, depending on the configurations.

Delay Based Scheduling (DBS)

As mentioned above, a scheduler performs scheduling decision every TTI to allocate resources among user equipments. Different scheduling algorithms are employed, in order to meet different QoS requirements. Round Robin (RR) scheduling and Proportional Fair (PF) scheduling are two commonly used scheduling algorithms, where the aim of RR is to get the absolute fairness, while PF aims to maintain a balance level between fairness and system throughput.

Additionally, Delay Based Scheduling (DBS) is another algorithm that is optimized for delay sensitive traffic, such as VoIP traffic. It considers the packet delay of different user equipments when performing prioritization among the user equipments. In most of cases, the user equipments with older packet in a buffer is prioritized over the others.

In order to meet the QoS requirement most of the packets of delay sensitive traffic shall arrive within a time budget. For the sake of simplicity, VoIP is taken as one example of delay sensitive traffic to illustrate this problem. VoIP packets are generated periodically as described above. According to a delay requirement of each single packet, in theory, the base station such as an eNB must always maintain a minimum bit rate for each VoIP user equipment in order to meet the requirement.

Assuming that 12.2 kilobits per second (kbps) is used as the VoIP RTP codec rate, if considering also the protocol headers, it will need at least 25-200 kbps to transmit the 12.2 kilobits (Kbits) RTP VoIP traffic, depending on the maximum number of segmentations for one VoIP packet. In case of a bad channel condition, the scheduler does not give enough TBS for the whole VoIP talk packet, instead RLC may chop the whole packet into small segments and send them one by one in a physical layer with a small TBS. However, one more segment requires one more MAC header which will increase the total bits rates on MAC Layer. If any of those small segments cannot be successfully transmitted on time due to any reason, all those transmitted segments will be discarded, and the QoS requirement will fail. One obvious reason in this case may be that the scheduling capacity is lower than the required bit rate.

The prior art link adaptation has been designed to adapt the modulation scheme according to the SINR, in order to achieve a stable transmission error rate, e.g. 10% retransmission. However this strict algorithm used to be too robust and could not work well in case of congestion, which results into huge buffer queuing and also starvation to each other. Thus a problem is that when the user equipment in congestion e.g. a bad channel condition such as e.g. temporarily in channel fading dip or at the cell border with strong interference, the base station cannot provide a certain VoIP user equipment with the required bit rate. The consequence is that the QoS requirement of such a VoIP user equipment will not be met regardless of which scheduling algorithm has been used, and all the scheduled resources allocated to this user equipment are useless and wasted. Moreover, according to the basic principle of DBS, those user equipments will very likely get higher priority than other user equipments, which may leave no scheduling resources for other user equipments in the same cell.

In order to illustrate the problem, a simple example is used to clarify it. Assuming that one VoIP Packet is 596 bits, i.e. 73 bytes, no ROHC, IPv4, AMR 12.2 Codec, and a user equipment that is at the cell edge where the Signal to Interference plus Noise Ratio (SINR) is very low and the power is limited, only very small TBS, can be used in order to meet the required 10% HARQ Block Error Rate (BLER). Since a MAC Header may be as large as 7 bytes, a typical TBS that is used in the bad SINR is 9 bytes to be able to carry minimum 2 bytes of payload. One byte is a grouping of 8 bits. According to 3GPP 36.213, Table 7.1.7.2.1-1, 9 bytes may be transmitted via physical layer during one transmission with MCS 2 and 2 SBs. In a worst case scenario, e.g. if also Buffer Status Report BSR and Power Headroom Report PHR information are transferred within the MAC PDU, the MAC headers may be 7 bytes, which implies that only 2 bytes may be used for transmitting the payload. Since the VoIP traffic is generated every 20 ms, but within the 20 millisecond (ms) only 2*20 payload bytes can be transmitted, this means that the base station will never be able to empty the buffer of the user equipment and satisfy latency requirements. Instead, the buffer of the user equipment will keep piling up. At the same time this user equipment is wasting one scheduling opportunity every TTI. In case there are other user equipments in the system, they might be prevented from getting scheduled and hence they may suffer from starvation issues. FIG. 1 illustrates one example of how a buffer of a user equipment is piling up in an extreme case where all the scheduling resources are wasted by this user equipment. An PDCP VoIP packet of 73 bytes is considered.

Note that FIG. 1 shows one of the extreme case which may be rare in a real situation, but still it illustrates the situation where the scheduled bits within 20 ms cannot catch up the coming data of this user equipment. When it happens, all scheduling resources are wasted and starving the other user equipments in the system. This problem will be linearly worse by the increased number of active user equipments in the system.

SUMMARY

It is therefore an object of embodiments herein to improve the performance of a wireless communications network.

According to a first aspect of embodiments herein, the object is achieved by a method in a base station for adapting link adaptation of a transmission between a user equipment and the base station. The link adaptation relates to an initial value of a Block Error Rate, BLER, related to the transmission. The base station decides that the user equipment is in congestion, when a scheduling bit rate for the transmission in relation to a rate of data packets arriving to or being sent by the user equipment, is below a first threshold. When the user equipment is in congestion, the base station adapts the link adaptation by increasing the value of the BLER of the link adaptation in relation to the initial value, until the user equipment is out of congestion or until the base station detects that any one of the user equipment and the base station tries to send high priority data.

According to a second aspect of embodiments herein, the object is achieved by a base station for adapting link adaptation of a transmission between a user equipment and the base station. The link adaptation relates to an initial value of a Block Error Rate, BLER, related to the transmission. The base station comprises a deciding circuit configured to decide that the user equipment is in congestion, when a scheduling bit rate for the transmission in relation to a rate of data packets arriving to or being sent by the user equipment, is below a first threshold. The base station further comprises an adapting circuit configured to, when the user equipment is in congestion, adapt the link adaptation by increasing the value of the BLER of the link adaptation in relation to the initial value, until the user equipment is out of congestion or until the base station detects that any one of the user equipment and the base station tries to send high priority data.

When the user equipment is in congestion a buffer of the user equipment is piling up. By increasing the value of the BLER of the link adaptation in relation to the initial value to be more aggressive, the buffer in the user equipment is cleared to free resources which may be used by other user equipments, which in turn enhances the performance in the wireless communications network.

An advantage with embodiments herein is that the overall wireless communication network capacity will be improved by the enhanced link adaptation since the scheduling resources is used more efficiently by limiting the resources used for out-of-date data.

Moreover it also improves the user equipment retainability by facilitating the user equipment to clear out the user equipment buffer to leave room for new critical data to keep the user equipment connected.

BRIEF DESCRIPTION OF THE DRAWINGS

Examples of embodiments herein are described in more detail with reference to attached drawings in which.

DETAILED DESCRIPTION

As stated above, some user equipments in a communication system occupy scheduling resources but do not generate any value. This prevents other user equipments in the system to get scheduling resources, which results in a poor performance of the communications system.

Embodiments herein provide some algorithms that improves the performance of the communications system by modifying link adaptation such that occupation of unnecessary resources are decreased considerably. Embodiments herein may be seen as alternatives to congestion control algorithms.

Figure 1:
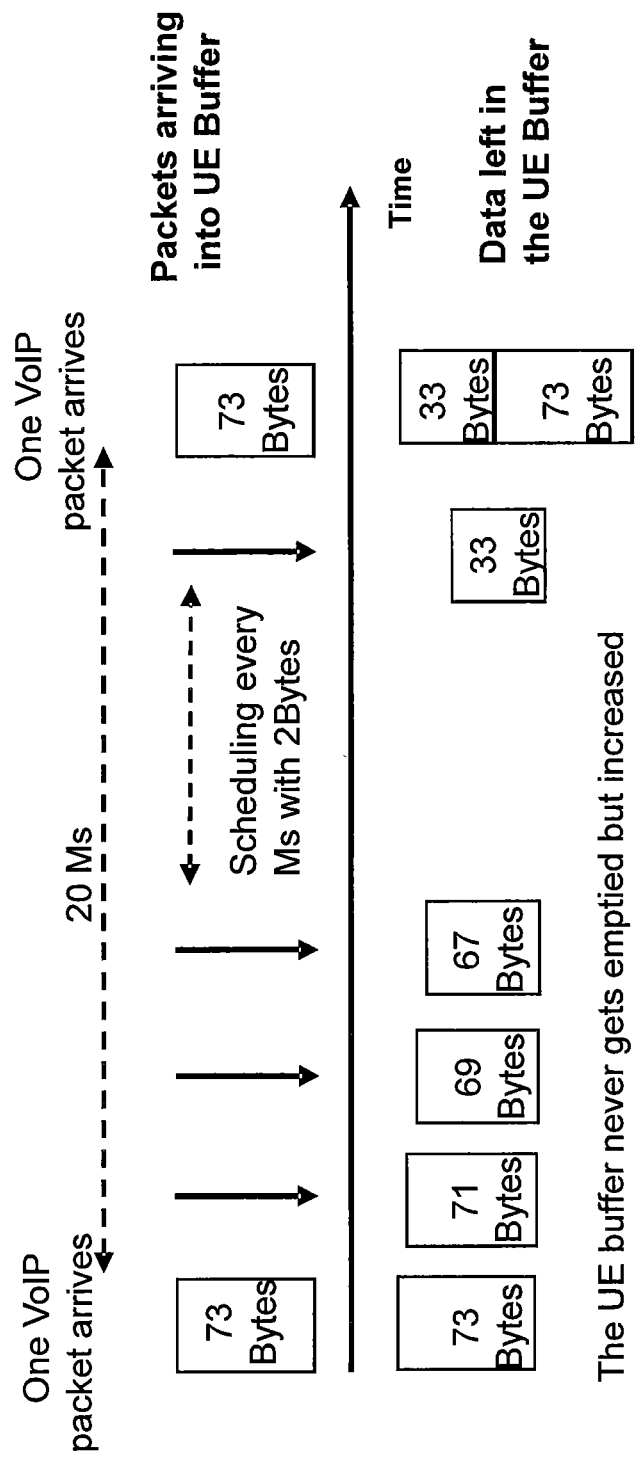
FIG. 1 is a schematic block diagram illustrating a buffer of a user equipment according to prior art.
Figure 2:
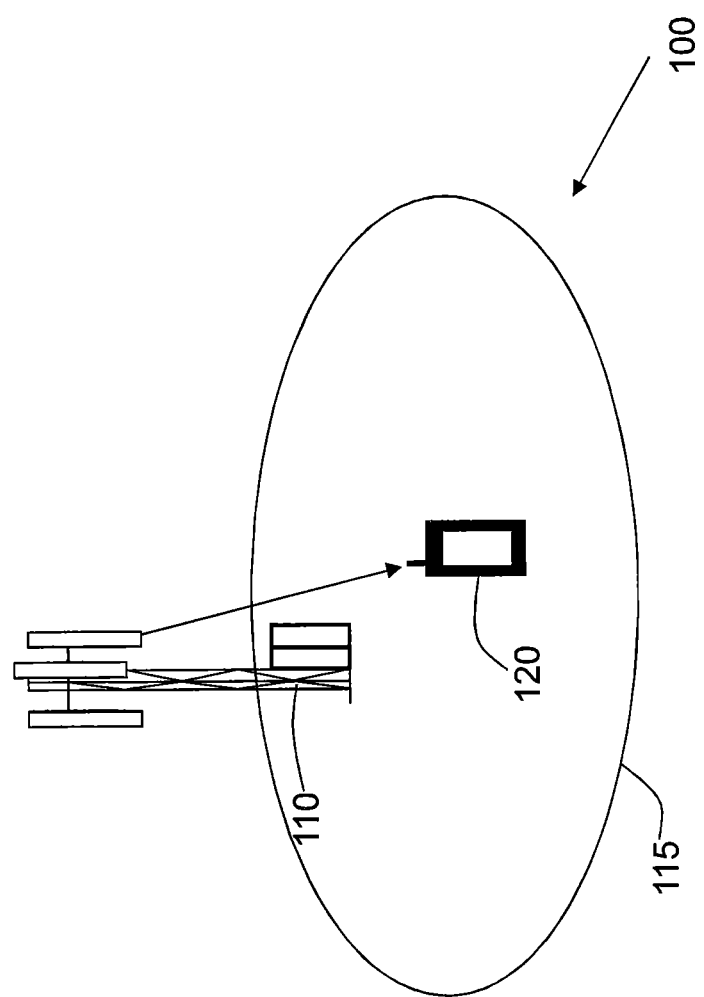
FIG. 2 is a schematic block diagram illustrating embodiments of a wireless communications network.

FIG. 2 depicts an example of a wireless communications network 100 according to a first scenario in which embodiments herein may be implemented. The wireless communications network 100 is a wireless communication network such as an LTE, WCDMA, Wimax, or any cellular network or system.

The wireless communications network 100 comprises plurality of network nodes whereof one, a base station 110 is depicted in FIG. 2. The base station 110 is a base station which may be referred to as a transmission point, a radio base station, an eNB, an eNodeB, an Home Node B, an Home eNode B or any other network node capable to serve a wireless terminal such as a user equipment or a machine type communication device in a wireless communications network. The base station 110 serves a cell 115.

A number of user equipments operates in the wireless communications network 100, whereof one, a user equipment 120 is shown in FIG. 2. The user equipment 120 is within radio range of the base station 110, this means that it may communicate wirelessly in the wireless communication network 100 via the base station 110.

The user equipment 120 may e.g. be, a wireless device, a mobile wireless terminal, a wireless terminal, a mobile phone, a computer such as e.g. a laptop, a Personal Digital Assistants (PDAs) or a tablet computer, sometimes referred to as a surf plate, with wireless capability, or any other radio network unit capable to communicate over a radio link in a wireless communications network. Please note the term user equipment used in this document also covers other wireless devices such as Machine to machine (M2M) devices.

The user equipment 120 may have user data to upload to base station 110, where packets comprising the user data to be transmitted are stored in a user equipment buffer comprised in the user equipment 120. Further, the base station 110 may have user data that the user equipment 120 is intend to download, where packets comprising the user data to be transmitted are stored in an associated user equipment buffer in the base station 110.

According to embodiments herein, in case of congestion, where a scheduling capacity cannot meet a QoS requirement of the user equipment 120, e.g. packet delay or minimum bit rate, link adaptation shall change the target from robustness transmission to aggressive transmission to be able to clear a buffer in the user equipment 120 with minimum amount of scheduling grants. By performing this, the user equipment 120 frees resources which may be used by other user equipments to improve the overall capacity. Moreover, by cleaning out of date queuing buffer of data packets, the user equipment 120 may achieve a minimum delay for the new coming data packets especially, once the user equipment 120 is out of congestion, such as e.g. recovered from a temporary channel dip.

The congestion means that the number of user equipments that is requesting to be scheduled is larger than the base station's 110 scheduling capacity. A reason for the user equipment 120 being in congestion is that the SINR of the user equipment 120 is low which results in lots of segmentation.

Figure 3:
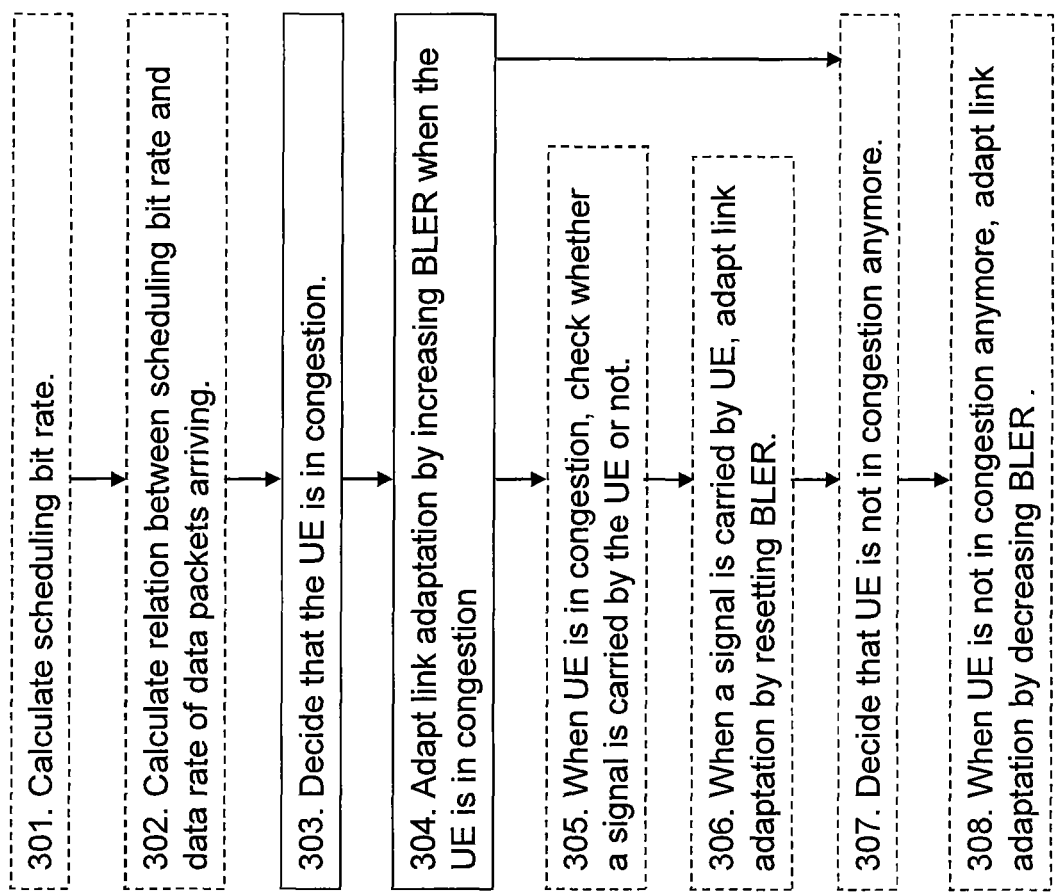
FIG. 3 is a flowchart depicting embodiments of a method in a base station.

Example of embodiments of a method in a base station 110 for adapting link adaptation of a transmission between a user equipment 120 and the base station 110 will now be described with reference to a flowchart depicted in FIG. 3. The link adaptation relates to an initial value of a Block Error Rate, BLER, related to the transmission. The transmission may be transmitted on a channel. As mentioned above, the user equipment 120 may be located in the cell 115.

The method comprises the following actions, which actions may be taken in any suitable order. Dashed lines of some boxes in FIG. 3 indicate that this action is not mandatory.

Action 301

Figure 4:
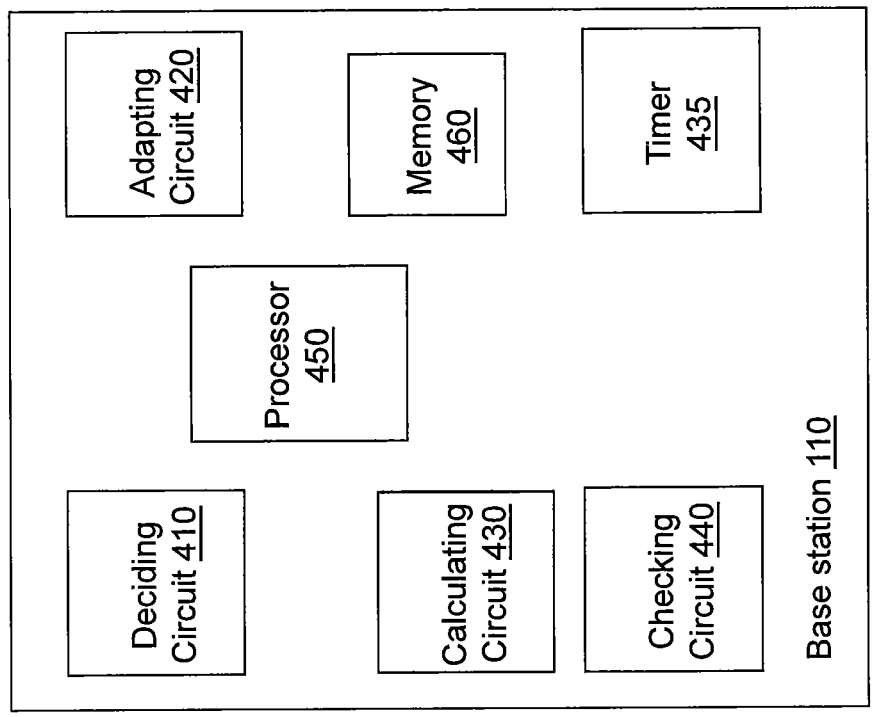
FIG. 4 is a schematic block diagram illustrating embodiments of a base station.

In order to be able to decide which state the user equipment 120 is currently in, regarding whether or not being in congestion, which will be performed in Action 303 below, the base station 110 may calculate the scheduling bit rate for the transmission. This may be performed periodically by using a timer 435 in the base station 110. This is performed for the user equipment 120 when it has been scheduled when the timer 435 is running. The timer 435 is illustrated in FIG. 4. This means that in some embodiments the timer 435 may be used to check the state the user equipment 120 of being in congestion or not periodically. In this way the user equipment 120 will not change the state of being in congestion or not, when the timer 435 is running, and previous decided BLER will be used until the timer 435 expired. An example 50-100 ms for periodicity may for example be used.

Action 302

In order to better be able to decide a state the user equipment 120 of being in congestion or not, the base station 110 may calculate the relation between the scheduling bit rate for the transmission and the rate of data packets arriving to or being sent by the user equipment 120. The scheduling bit rate for the transmission may be represented by the average scheduled bit rate within a time interval where a load of the cell 115 and a condition of the channel are taken into consideration.

Action 303

The base station 110 decides that the user equipment 120 is in congestion, when a scheduling bit rate for the transmission in relation to a rate of data packets arriving to or being sent by the user equipment 120, is below a first threshold. The first threshold may be set the same as a required bit rate with a margin, such as 0.2, giving 12.2*(1−0.2) Kbps when using AMR 12.2 Kpbs codec. The margin may be set according to the aggressive level which presents a different operation strategy. This means that, to determine if the user equipment 120 is in congestion, the base station 110 may compare the scheduling bit rate and the required bit rate of the user equipment 120 e.g. during a short time window. A suitable example of a time window may be half of the required delay budget of a certain traffic which may give more room for the base station 110 to adjust during the other half of delay budget, as e.g. for voice, it will be 50 ms with delay budget of 100 ms according to 3GPP. The base station 110 knows the bit rate of a certain service, for example the bit rate of VoIP is commonly 12.2 kbps. This may e.g. be performed by comparing how much data that can be scheduled to the user equipment 120 and how much new data that is arriving to or is sent by the user equipment 120 in the application layer by removing all the transmission protocol header. In case of VoIP, it should be the RTP payload data, by moving all the MAC/RLC/PDCP/UPD/IP/TCP headers.

Action 304

In some embodiments, the adapting of the link adaptation to be performed in Action 305 below, is performed partly based on that none of the user equipment 120 and the base station 110 tries to send high priority data. Thus in these embodiments, when the user equipment 120 is in congestion, the base station 110 checks whether or not any one of the user equipment 120 and the base station 110 tries to send high priority data. In most of cases, the base station 110 knows if there is a signal on going or not, but in some user equipment 120 initiated bearer setup signals, is not known by the base station 110, and in that case the base station 110 may perform the check whether or not any one of the user equipment 120 and the base station 110 tries to send high priority data.

Action 305

When the user equipment 120 is in congestion, the base station 110 adapts the link adaptation. To help the user equipment 120 to get out the congestion the link adaptation is adapted to increase the BLER to be more aggressive. When the user equipment 120 is in congestion the buffer of the user equipment 120 is piling up. The buffer of the user equipment 120 need to be cleared as fast as possible to free resources which may be used by other user equipments. Thus, the adapting of the link adaptation is performed by increasing the value of the BLER of the link adaptation in relation to the initial value, until the user equipment 120 is out of congestion or until the base station 110 detects that any one of the user equipment 120 and the base station 110 tries to send high priority data. This may be seen as the link adaptation target is changing from robust transmission to aggressive transmission when the user equipment 120 is in congestion. Typically the initial BLER is 10% which means that there is going to be one failure out of 210 transmissions. This is a very robust algorithm considering the retransmission procedure. By increasing the BLER as mentioned above will make the link adaptation more aggressive. A reasonable step upwards may be the same as the intimal value, 10%, but it may be changed according to different operation strategy, capacity, quality, etc. In this way, the buffer of the user equipment 120 is cleared with minimum amount of scheduling grants since larger TBS is allocated for each scheduling due to the increase of BLER. By performing this, the user equipment 120 frees resources which may be used by other user equipments to improve the overall capacity.

The increasing of the value of the BLER may be performed stepwise. It may be advantageous to set an upper limit of the increasing of the value of the BLER, since it make no sense if the BLER is 1. But this is not necessary. The increased step in some embodiments may be different according to the cell deployment and also the maximum cell capacity. But in general, 5% to 10% is a good value for the BLER increase step. By setting a very large value of the BLER increase step is the same as "give a huge grant to empty the buffer of the user equipment 120 when user equipment 120 is in bad condition", i.e. congestion. By giving a more reasonable value, i.e. smaller value of the BLER increase step, the link adaptation is adapted in a more reliable pace to be more controllable.

In some embodiments, the adapting of the link adaptation by increasing the value of the BLER is performed when also a further condition is fulfilled. The further condition comprises that none of the user equipment 120 and the base station 110 tries to send high priority data. A high priority data like RRC signalling such as handover command, is essential to keep the user equipment 120 connected to the base station 110 and very sensitive to the packet loss rate. Therefore, in those cases, link adaption may not be set to be aggressive, otherwise those RRC signalling might not go through. Therefore, it is critical to handle the high priority data carefully to maintain a good Key Performance Indicators (KPI). So for the user equipment 120 being in congestion and in some embodiments also is not sending or receiving any signalling, the BLER is increased to be more aggressive to help the user equipment to get out the congestion. The base station 110 checked whether or not any one of the user equipment 120 and the base station 110 tries to send high priority data in Action 304 above.

Action 306

In some embodiments the base station 110 has checked if there is any signal on going, see Action 304 above. If there is any signal on going, the BLER may be reset to the initial value which is aimed for good robustness, even though the user equipment 120 was in congestion, i.e. bad condition and BLER has been increased. Thus, when any one of the user equipment 120 and the base station 110 tries to send high priority data, according to some embodiments the base station 110 adapts the link adaptation by resetting the BLER to the initial value.

Action 307

If the user equipment 120 is out of congestion the link adaptation may be adapted back to robust transmission. Thus in some specific embodiments, the base station 110 decides that the user equipment 120 is out of congestion, when a scheduling bit rate for the transmission in relation to a rate of data packets arriving to or being sent by the user equipment 120 is above or equal to a second threshold. The Minimum required bit rate may be used as a value for the second threshold.

In a wireless communications network such as the wireless communications network 100, very often user equipment's SINR is fluctuating a lot and may only stay in bad SINR temporally and recover soon, therefore preferably, the link adaption should be prepared to be back to the robust level when a user equipment such as the user equipment 120 is recovered, since it is always better to have lower packet loss rate if the base station 110 has enough capacity.

Action 307

When the user equipment 120 is not in bad condition anymore, e.g. it may just be recovered from bad condition, i.e. congestion, the BLER may be decreased with the same step size as the increased step in action 305. With a margin of e.g. 10% as the increased step, it may be 10%*(1+50%) also for the decreased step but preferably not lower than the initial value. Thus, in some specific embodiments, when it is decided that the user equipment 120 is out of congestion, the base station 110 may adapt the link adaptation by decreasing the value of the BLER of the link adaptation in relation to the increased value of the BLER. The decreased value of the BLER is above or equal to the initial value of the BLER.

To perform the method actions for adapting link adaptation of a transmission between a user equipment 120 and the base station 110, described above in relation to FIG. 3, the network node 130, 111 comprises the following arrangement depicted in FIG. 4. As mentioned above the link adaptation relates to an initial value of a BLER related to the transmission.

The base station 110 comprises a deciding circuit 410 configured to decide that the user equipment 120 is in congestion, when a scheduling bit rate for the transmission in relation to a rate of data packets arriving to or being sent by the user equipment 120, is below the first threshold.

The deciding circuit 410 may further be configured to decide that the user equipment 120 is out of congestion, when a scheduling bit rate for the transmission in relation to a rate of data packets arriving to or being sent by the user equipment 120 is above or equal to the second threshold.

The base station 110 further comprises an adapting circuit 420 configured to, when the user equipment 120 is in congestion, adapt the link adaptation by increasing the value of the BLER of the link adaptation in relation to the initial value, until the user equipment 120 gets out of congestion or until the base station 110 detects that any one of the user equipment 120 and the base station 110 tries to send high priority data.

In some embodiments the increasing of the value of the BLER is to be performed stepwise.

The adapting circuit 420 may further be configured to perform the adaption of the link adaptation by increasing the value of the BLER when also a further condition is fulfilled. The further condition comprises that none of the user equipment 120 and the base station 110 tries to send high priority data.

In some embodiments the adapting circuit 420 further is configured to, when any one of the user equipment 120 and the base station 110 tries to send high priority data adapt the link adaptation by resetting the BLER to the initial value.

The adapting circuit 420 may further be configured to, when it is decided that the user equipment 120 is out of congestion, adapt the link adaptation by decreasing the value of the BLER of the link adaptation in relation to the increased value of the BLER. The decreased value of the BLER is above or equal to the initial value of the BLER.

In some embodiments, the user equipment 120 is arranged to be located in a cell 115, and the transmission is to be transmitted on a channel. In these embodiments the base station 110 may further comprise a calculating unit 430 configured to calculate the relation between the scheduling bit rate for the transmission and the rate of data packets arriving to or being sent by the user equipment 120. The scheduling bit rate for the transmission may be represented by the average scheduled bit rate within a time interval where a load of the cell 115 and a condition of the channel are taken into consideration.

The base station 110 may further comprise the timer 435. The timer 435 is configured to periodically trigger the calculating unit 430 to calculate the scheduling bit rate for the transmission.

The base station 110 further comprises a checking circuit 440 configured to, when the user equipment 120 is in congestion, check whether or not any one of the user equipment 120 and the base station 110 tries to send high priority data.

The embodiments herein for adapting link adaptation of a transmission between a user equipment 120 and the base station 110 may be implemented through one or more processors, such as a processor 450 in the base station 110 depicted in FIG. 4, together with computer program code for performing the functions and actions of the embodiments herein. The program code mentioned above may also be provided as a computer program product, for instance in the form of a data carrier carrying computer program code for performing the embodiments herein when being loaded into the in the base station 110. One such carrier may be in the form of a CD ROM disc. It is however feasible with other data carriers such as a memory stick. The computer program code may furthermore be provided as pure program code on a server and downloaded to the base station 110.

The base station 110 may further comprise a memory 460 comprising one or more memory units. The memory 460 is arranged to be used to store obtained information, BLER values, data, configurations, schedulings, and applications to perform the methods herein when being executed in the base station 110.

Those skilled in the art will also appreciate that the deciding circuit 410, the adapting circuit 420, the calculating unit 430 and the checking circuit 440 described above may refer to a combination of analog and digital circuits, and/or one or more processors configured with software and/or firmware, e.g. stored in the memory 460, that when executed by the one or more processors such as the processor 450 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a base station for adapting link adaptation of a transmission between a user equipment and the base station, which link adaptation relates to an initial value of a Block Error Rate, BLER, related to the transmission, the method comprising:
    deciding that the user equipment is in congestion responsive to a scheduling bit rate for the transmission in relation to a rate of data packets arriving to or being sent by the user equipment being below a first threshold;
    responsive to the user equipment being in congestion, adapting the link adaptation by increasing the value of the BLER of the link adaptation in relation to the initial value, until the user equipment is out of congestion or until the base station detects that any one of the user equipment and the base station tries to send high priority data;
    deciding that the user equipment is out of congestion, responsive to the scheduling bit rate for the transmission in relation to the rate of data packets arriving to or being sent by the user equipment being above or equal to a second threshold; and
    responsive to deciding that the user equipment is out of congestion, adapting the link adaptation by decreasing the value of the BLER of the link adaptation in relation to the increased value of the BLER, which decreased value of the BLER is above or equal to the initial value of the BLER.

2. The method according to claim 1, wherein the increasing of the value of the BLER is performed stepwise.

3. The method according to claim 1, wherein the adapting of the link adaptation by increasing the value of the BLER is performed further responsive to detecting that none of the user equipment and the base station are trying to send high priority data.

4. The method according to claim 1, wherein the user equipment is located in a cell, and wherein the transmission is to be transmitted on a channel, the method further comprising:
    calculating the relation between the scheduling bit rate for the transmission and the rate of data packets arriving to or being sent by the user equipment, wherein the scheduling hit rate for the transmission is represented by the average scheduled bit rate within a time interval where a load of the cell and a condition of the channel are taken into consideration.

5. The method according to claim 4, further comprising:
    periodically calculating the scheduling bit rate for the transmission.

6. The method according to claim 1, further comprising:
    responsive to the user equipment being in congestion, determining whether or not any one of the user equipment and the base station tries to send high priority data, and
    responsive to determining that any one of the user equipment and the base station tries to send high priority data, adapting the link adaptation by resetting the BLER to the initial value.

7. A base station for adapting link adaptation of a transmission between a user equipment and the base station, which link adaptation relates to an initial value of a Block Error Rate, BLER, related to the transmission, the base station comprising:
    a deciding circuit configured to decide that the user equipment is in congestion responsive to a scheduling bit rate for the transmission in relation to a rate of data packets arriving to or being sent by the user equipment being below a first threshold, and
    an adapting circuit configured to respond to the user equipment being in congestion by adapting the link adaptation by increasing the value of the BLER of the link adaptation in relation to the initial value, until the user equipment is out of congestion or until the base station detects that any one of the user equipment and the base station tries to send high priority data,
    wherein the deciding circuit further is configured to decide that the user equipment is out of congestion responsive to the scheduling bit rate for the transmission in relation to the rate of data packets arriving to or being sent by the user equipment being above or equal to a second threshold,
    and wherein the adapting circuit further is configured to respond to deciding that the user equipment is out of congestion by adapting the link adaptation by decreasing the value of the BLER of the link adaptation in relation to the increased value of the BLER, which decreased value of the BLER is above or equal to the initial value of the BLER.

8. The base station according to claim 7, wherein the increasing of the value of the BLER is to be performed stepwise.

9. The base station according to claim 7, wherein the adapting circuit further is configured to perform the adaption of the link adaptation by increasing the value of the BLER further responsive to determining that none of the user equipment and the base station tries to send high priority data.

10. The base station according to claim 7, wherein the user equipment is located in a cell, and wherein the transmission is to be transmitted on a channel, the base station further comprising:
 a calculating circuit configured to calculate the relation between the scheduling bit rate for the transmission and the rate of data packets arriving to or being sent by the user equipment, wherein the scheduling bit rate for the transmission is represented by the average scheduled bit rate within a time interval where a load of the cell and a condition of the channel are taken into consideration.

11. The base station according to claim 10, wherein the base station comprises a timer configured to periodically trigger the calculating circuit to calculate the scheduling bit rate for the transmission.

12. The base station according to claim 7, further comprising a checking circuit configured to respond to the user equipment being in congestion by checking whether or not any one of the use equipment and the base station tries to send high priority data,
 and wherein the adapting circuit further is configured to respond to determining that any one of the user equipment and the base station is trying to send high priority data by adapting the link adaptation by resetting the BLER to the initial value.

* * * * *